United States Patent
Le

(10) Patent No.: US 6,695,691 B1
(45) Date of Patent: Feb. 24, 2004

(54) DOOR ASSEMBLY FOR A VEHICLE HVAC SYSTEM AND METHOD FOR MAKING SAME

(75) Inventor: Vu Le, Huntington Woods, MI (US)

(73) Assignee: TRW Automotive U.S. LLC, Farmington Hills, MI (US)

( * ) Notice: Subject to any disclaimer, the term of this patent is extended or adjusted under 35 U.S.C. 154(b) by 0 days.

(21) Appl. No.: 10/403,935

(22) Filed: Mar. 31, 2003

(51) Int. Cl.[7] .................................................. B60H 3/00
(52) U.S. Cl. ........................ 454/156; 454/121; 454/126; 454/160; 454/161
(58) Field of Search ................................ 454/121, 126, 454/156, 160, 161

(56) References Cited

U.S. PATENT DOCUMENTS

| | | |
|---|---|---|
| 6,048,263 A | 4/2000 | Uchida et al. |
| 6,209,404 B1 | 4/2001 | Le |
| 6,224,480 B1 | 5/2001 | Le et al. |
| 6,450,877 B2 * | 9/2002 | Tsurushima et al. ........ 454/121 |

* cited by examiner

Primary Examiner—Jiping Lu
(74) Attorney, Agent, or Firm—Tarolli, Sundheim, Covell & Tummino L.L.P.

(57) ABSTRACT

A door assembly (30) for a vehicle HVAC system comprises a shaft (140) made of a first material and having an axis (144) of rotation. A first door (142) projects from the first shaft (140) and is made of the first material. The first door (142) is molded together with the shaft (140). A sleeve (150) is made of a second material that has a lower melting point than the first material to enable the sleeve to be molded over the shaft (140). The sleeve (150) is disposed coaxially about the shaft (140) and is rotatable about the axis (144) relative to the shaft. A second door (152) projects from the sleeve (150). The second door (152) is made of the second material and is molded together with the sleeve (150). The second door (152) is rotatable relative to the first door (142).

10 Claims, 7 Drawing Sheets

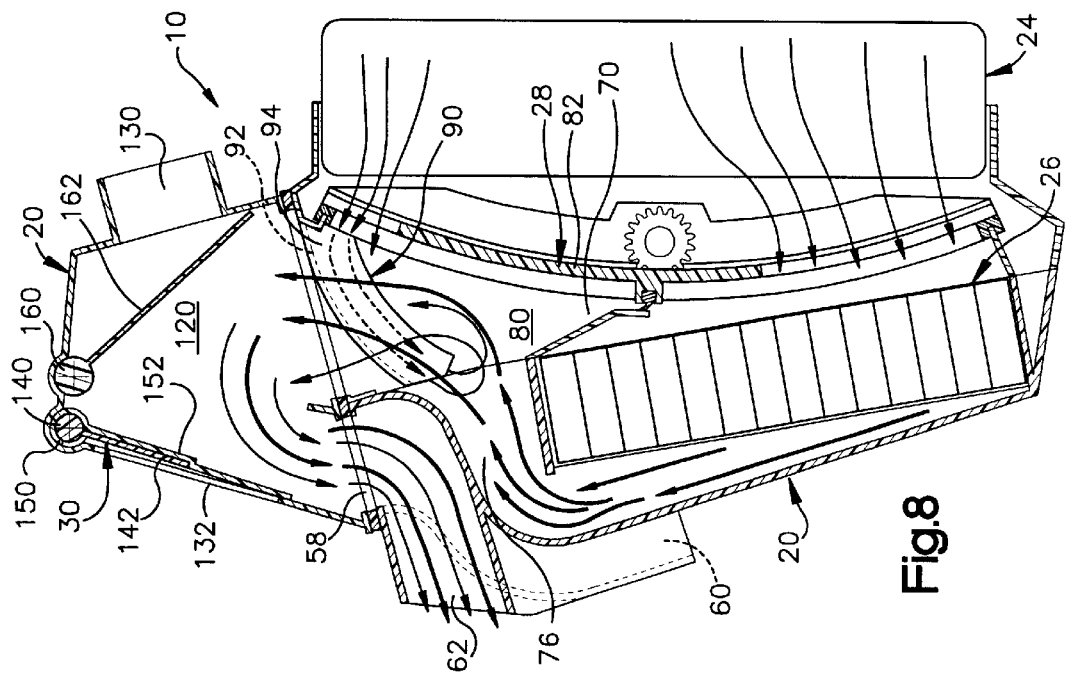
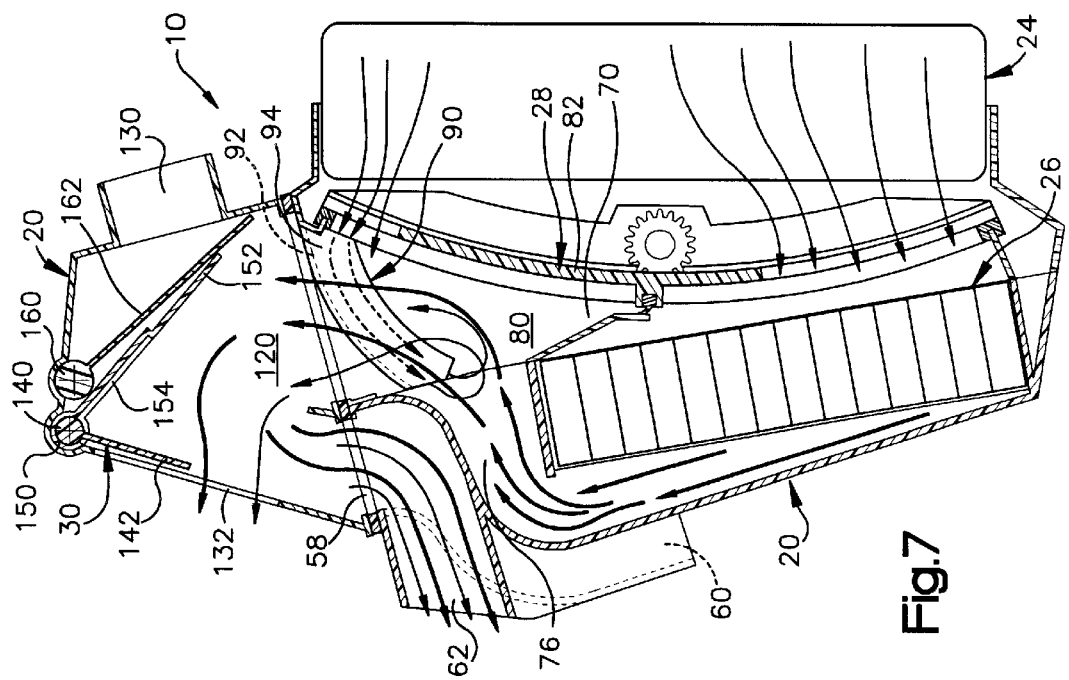

DOOR ASSEMBLY FOR A VEHICLE HVAC SYSTEM AND METHOD FOR MAKING SAME

TECHNICAL FIELD

The present invention relates to a door assembly for a heating, ventilation, and air conditioning (HVAC) system in a vehicle and a method for making the same.

BACKGROUND OF THE INVENTION

In a typical vehicle heating, ventilation, and air conditioning system (HVAC) system, a heater core is mounted in an air duct downstream of an evaporator core. Hot engine coolant is circulated through the heater core to heat air directed through the heater core. For air conditioning, a refrigerant is circulated through the evaporator core to cool air directed through the evaporator core. Control of the air temperature is obtained by controlling the flow of air from the evaporator core into the heater core. For maximum cooling, all of the air flow from the evaporator core bypasses the heater core and travels through a chamber and into the passenger compartment. Alternatively, for maximum heating, all of the air flow from an inactive evaporator core passes through the heater core, where the air is heated, before traveling through the chamber and into the passenger compartment. Intermediate these two extremes, bypass (cold) air flow and air flow through the heater core are mixed in the chamber to provide air into the passenger compartment at intermediate temperatures.

Many of the components of the HVAC system, such as the heater core, the evaporator core, the ducting, and the chamber described above, are located in the vehicle instrumental panel. Physical space in the vehicle instrument panel has historically been limited, and is even more limited today as new electronic devices and convenience features are being added to the instrument panel. Consequently, the volume of space in the instrument panel that is taken up by the HVAC system must be minimized.

Minimizing the space taken up by the HVAC system in the instrument panel includes minimizing the space taken up by a plenum that directs the air out into the passenger compartment through various ducts, such as instrument panel ducts, front rear seat floor ducts, and defroster ducts. One or more doors are typically mounted in the plenum and are movable between multiple positions to direct the air from the HVAC system through one or more of the aforementioned ducts. In the interest of saving space in the instrument panel, as well as time and cost during manufacture, it is desirable to simplify the construction of the doors.

SUMMARY OF THE INVENTION

The present invention is a door assembly for use in a heating, ventilation, and air conditioning system in a vehicle. The door assembly comprises a rotatable shaft made of a first polymeric material and having an axis about which the shaft rotates. A first door projects radially from the first shaft. The first door is made of the first polymeric material and is molded together with the shaft as a continuous, unitary part so that the first door is rotatable about the axis. A rotatable sleeve is made of a second polymeric material that has a lower melting point than the first polymeric material to enable the sleeve to be molded over the shaft. The sleeve is disposed coaxially about the shaft and is rotatable about the axis relative to the shaft. A second door projects radially from the sleeve. The second door is made of the second polymeric material and is molded together with the sleeve as a continuous, unitary component so that the second door is rotatable about the axis relative to the first door.

In accordance with another aspect, the present invention is an apparatus for a heating, ventilation, and air conditioning system that provides air at a controlled temperature into a passenger compartment in a vehicle. The apparatus comprises a housing having a chamber. The housing defines at least one inlet through which air flows into the chamber. The housing further defines at least two outlets for directing air flow out of the chamber. A door assembly is disposed in the chamber. The door assembly comprises a rotatable shaft made of a first polymeric material and having an axis about which the shaft rotates, and a first door projecting radially from the first shaft the first door being made of the first polymeric material. The first door and the shaft comprise a continuous, one-piece, unitary part so that the first door is rotatable about the axis with the shaft. The first door is movable to at least partially block air flow out of one of the at least two outlets. The door assembly further comprises a rotatable sleeve made of a second polymeric material that has a lower melting point than the first polymeric material to enable the sleeve to be molded over the shaft. The sleeve is disposed coaxially about the shaft and is rotatable about the axis relative to the shaft. A second door projects radially from the sleeve. The second door is made of the second polymeric material. The second door and the sleeve comprise a continuous, one-piece, unitary component so that the second door is rotatable about the axis relative to the first door. The second door is movable to block air flow out of the one of the at least two outlets.

The present invention further includes a method for providing a door assembly for a heating, ventilation, and air conditioning system. According to the inventive method a first component comprising a first door and a shaft is molded out of a first polymeric material having a first melting point. The first door projects radially from the shaft and is rotatable along with the shaft about an axis. A second component is then overmolded about the first component. The second component is made of a second polymeric material having a second melting point that is lower than the first melting point of the first polymeric material. The second component comprises a second door projecting radially from a sleeve that is coaxially disposed about the shaft and is rotatable relative to the shaft.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 7 is a view similar to FIG. 6 illustrating parts of the apparatus in different positions;

FIG. 8 is a view similar to FIG. 6 illustrating parts of the apparatus in different positions;

DESCRIPTION OF EMBODIMENTS

Figure 1:
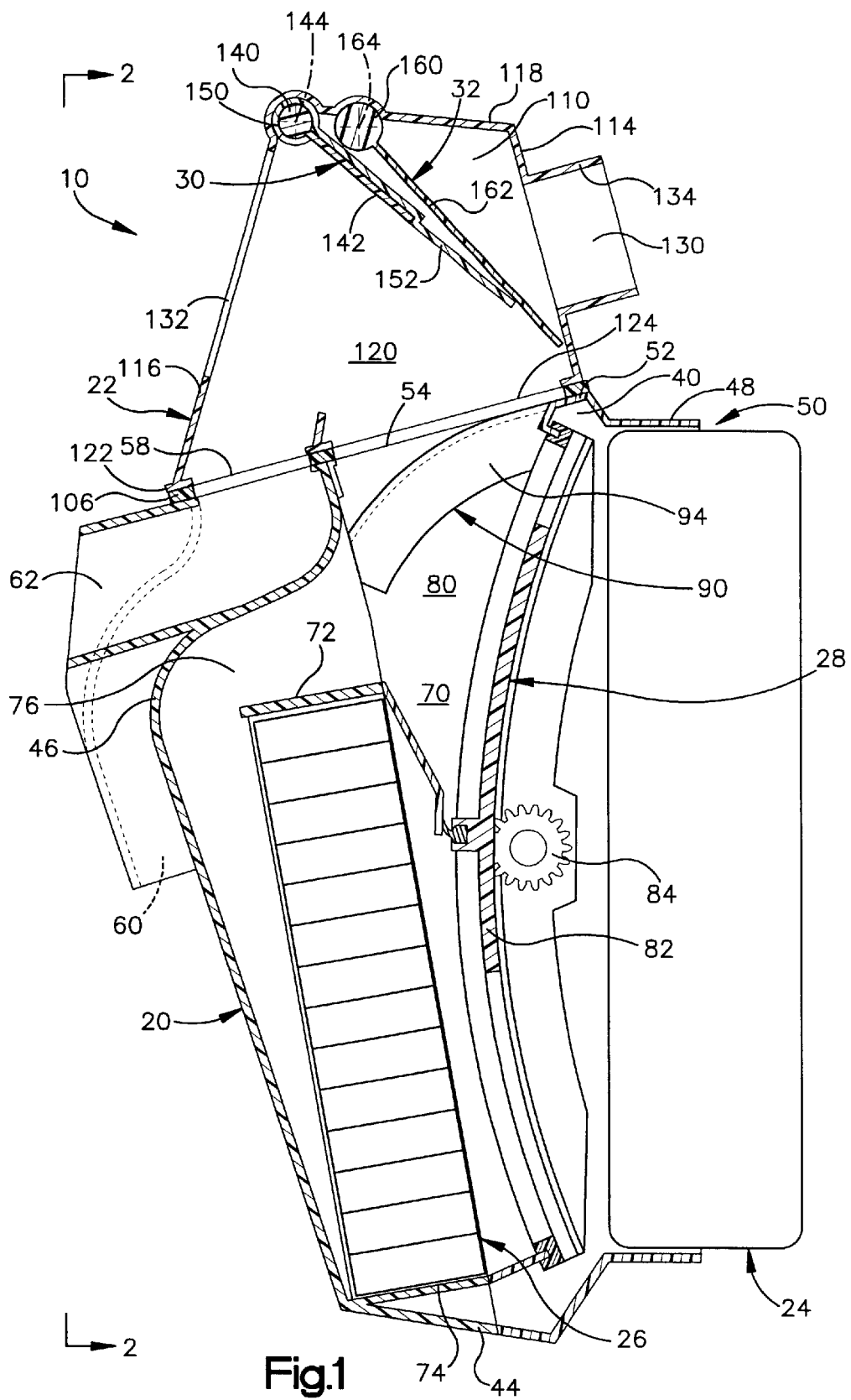
FIG. 1 is a sectional view of an apparatus for mixing air in a vehicle HVAC system.

The present invention relates to a door assembly for a heating, ventilation, and air conditioning (HVAC) system in a vehicle and a method for making the same. As representative of the present invention, FIG. 1 illustrates an apparatus 10 that comprises a portion of an HVAC system for providing air at a controllable temperature into a passenger compartment (not shown) of a vehicle. The apparatus 10 is designed to be located in a vehicle instrument panel (not shown). The apparatus 10 includes first and second housings 20 and 22, an evaporator core 24, a heating core 26, a sliding door assembly 28, and first and second rotating door assemblies 30 and 32.

Figure 2:
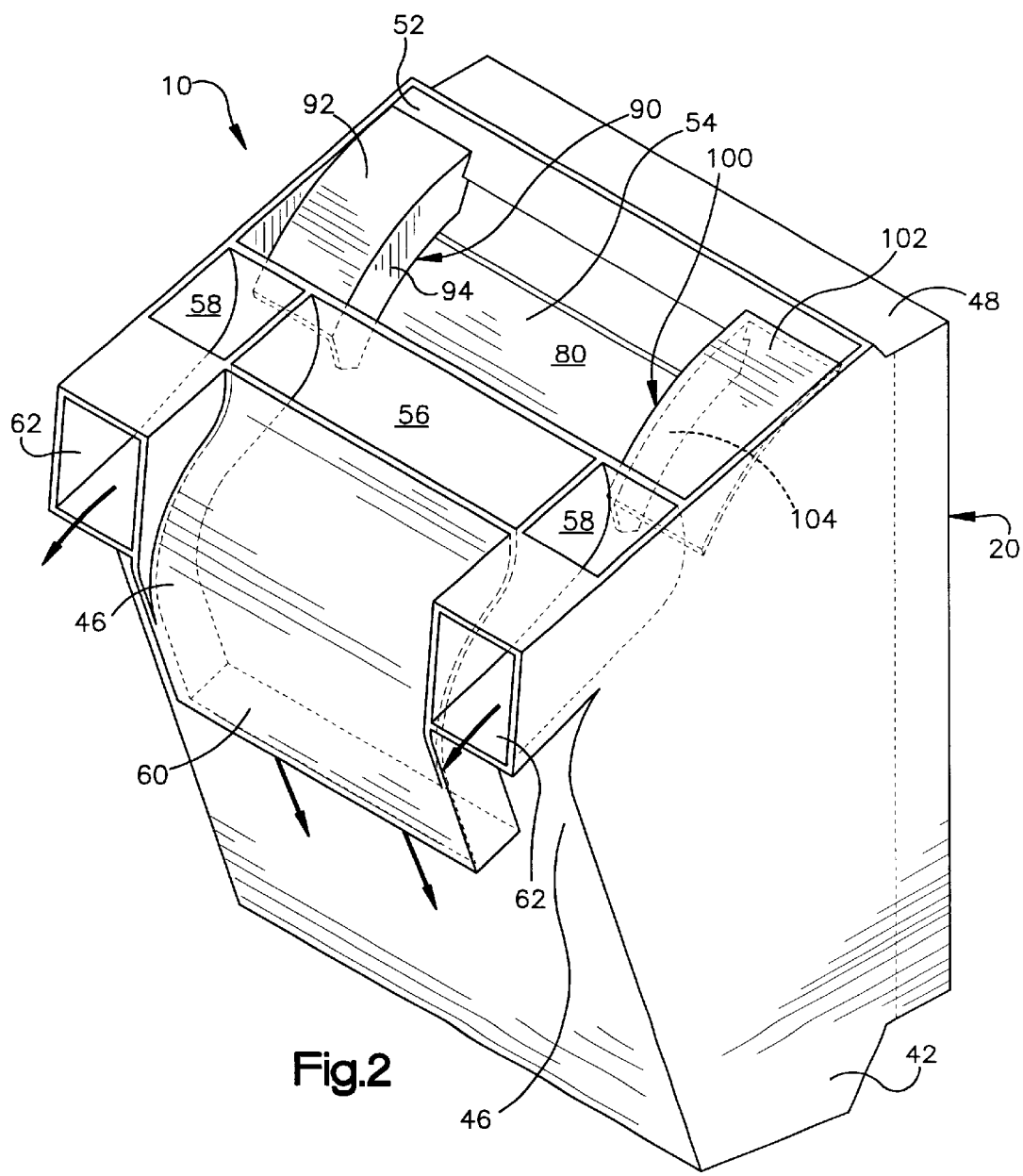
FIG. 2 is a front view taken along line 2—2 in FIG. 1.

The first housing 20 is made of a polymeric material and has a box-like shape. The first housing 20 may be made of a single part or by joining, using any known and suitable means, multiple parts. The first housing 20 is defined by oppositely disposed first and second side walls 40 and 42 (FIG. 3), a lower (as viewed in FIG. 1) wall 44, and a curved back wall 46. Opposite the back wall 46, the first housing 20 includes a generally square-shaped frame defining a large window 50. The evaporator core 24 is disposed in the window 50 and is secured to the frame 48 in a manner not shown. Opposite the lower wall 44, the first housing 20 includes an upper (as viewed in FIG. 1) wall 52 that defines an outlet 54 directing air from the first housing into the second housing 22. The upper wall 52 of the first housing 20 also partially defines a first outlet 56 (FIG. 2) and a pair of second outlets 58 disposed on opposite ends of the first outlet. The first outlet 56 directs air into a front seat floor duct 60 formed in the first housing 20. The second outlets 58 direct air into a corresponding pair of rear seat floor ducts 62 formed in the first housing 20.

The side walls 40 and 42, the lower wall 44, and the back wall 56 together define a chamber 70 (FIG. 1) inside the housing. Upper (as viewed in FIG. 1) and lower support members 72 and 74 are disposed in a lower portion of the chamber 70. The heater core 26 is secured in the chamber 70 by the support members 72 and 74 in a manner not shown. A heated air inlet duct 76 is formed in the chamber 70 between the curved back wall 46 and the upper support member 72. Heated air exiting the heater core 26 flows through the heated air inlet duct 76 and into a mixing portion 80 of the chamber 70 that is defined between the upper support member 72 and the outlet 54 to the second housing 22.

The sliding door assembly 28 is disposed in the chamber 70 adjacent the frame 48 and the evaporator core 24 mounted therein. The sliding door assembly 28, is described in detail in U.S. Pat. No. 6,224,480 B1, which is assigned to the assignee of the present invention. The sliding door assembly 28 includes an arcuate door 82 that is driven by gears 84. The sliding door assembly 28 is operated by an actuator (not shown) to vary (a) the amount of air that flows from the evaporator core 24 into the heater core 26, and (b) the amount of air that flows from the evaporator core directly into the mixing portion 80 of the chamber 70.

Figure 3:
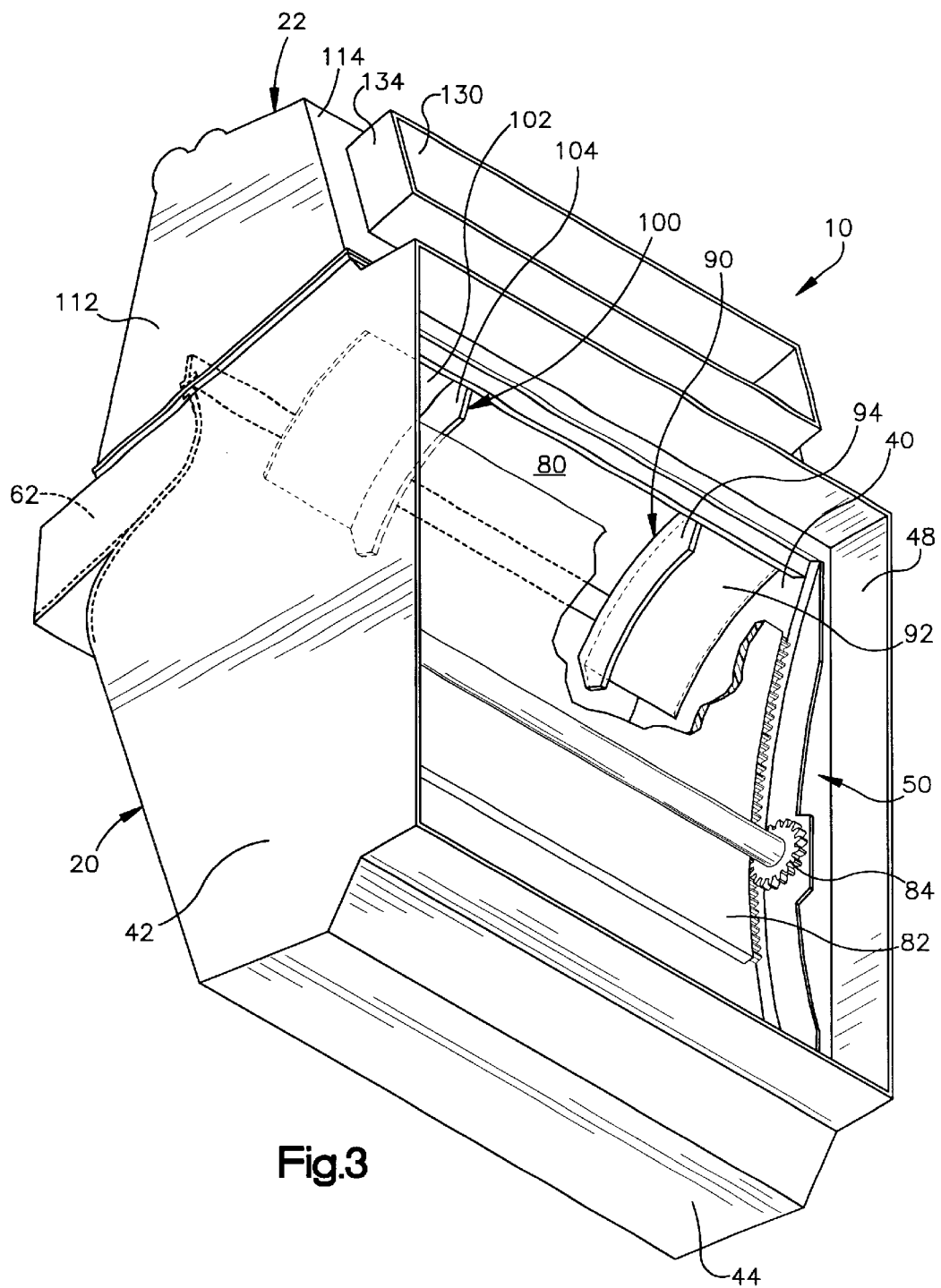
FIG. 3 is a perspective view of the apparatus of FIG. 1.

As may be seen in FIG. 3, first and second airflow diverters 90 and 100 are located in the mixing portion 80 of the chamber 70. The first airflow diverter 90 projects into the mixing portion 80 of the chamber 70 from the first side wall 40 of the housing 20. The first airflow diverter 90 is attached to the first side wall 40 by a suitable fastening means, such as, for example, fasteners (not shown) or through ultrasonic welding. Alternatively, the first airflow diverter 90 can be formed (i.e., molded) together with the first housing 20 as a continuous, unitary part.

The first airflow diverter 90 includes a first wall 92 having an arcuate shape and that extends at a right angle from the first side wall 40. The first airflow diverter 90 further includes a planar second wall 94 that extends downward (as viewed in FIGS. 1–3) at a right angle from the first wall 92. It should, however, be understood by those skilled in the art that the first airflow diverter 90 could be configured differently. For example, the first wall 92 of the first airflow diverter 90 could be planar and extend in parallel with the upper wall 52 of the first housing 20. Further, the second wall 94 of the first airflow diverter 90 could have an arcuate shape. Additional alternatives for the first airflow diverter 90 include omitting the second wall 94 or adding additional walls, such as baffling walls underneath the first wall 92.

The second airflow diverter 100 projects into the mixing portion 80 of the chamber 70 from the second side wall 42 of the first housing 20. The second airflow diverter 100 is attached to the second side wall 42 by a suitable fastening means, such as, for example, fasteners (not shown) or through ultrasonic welding. Alternatively, the second airflow diverter 100 can be formed (i.e., molded) together with the first housing 20 as a continuous, unitary part.

The second airflow diverter 100 is a mirror image of the first airflow diverter 90. It should, however, be understood by those skilled in the art that the second airflow diverter 100 does not have to be a mirror image of the first airflow diverter 90. The second airflow diverter 100 includes a first wall 102 having an arcuate shape and that extends at a right angle from the second side wall 42. The second airflow diverter 100 further includes a planar second wall 104 that extends downward (as viewed in FIGS. 1–3) at a right angle from the first wall 102. As with the first airflow diverter 90, it should be understood by those skilled in the art that the second airflow diverter 100 could be configured differently. For example, the first wall 102 of the second airflow diverter 100 could be planar and extend in parallel with the upper wall 52 of the first housing 20. Further, the second wall 104 of the second airflow diverter 100 could have an arcuate shape. Additional alternatives for the second airflow diverter 100 include omitting the second wall 104 or adding additional walls, such as baffling walls underneath the first wall 102.

The second housing 22 of the apparatus 10 is mounted to the upper wall 52 of the first housing 20. A seal 106 (FIG. 1) is positioned between the first and second housings 20 and 22. The second housing 22 has a box-like configuration and is made of a polymeric material. The second housing 22 has oppositely disposed first and second side walls 110 and 112 (FIG. 3), a front wall 114, a back wall 116, and an upper (as viewed in FIG. 1) wall 118. The side walls 110 and 112, the front wall 114, the back wall 116, and the upper wall 118 together define a plenum chamber 120 inside the second housing 22. The plenum chamber 120 is in fluid communication with, and functions as an extension of, the mixing portion 80 of the chamber 70 in the first housing 20.

Opposite the upper wall 118, the second housing 22 includes a lower wall 122 that mirrors the upper wall 52 of the first housing 20. The lower wall 122 in the second housing 22 includes an inlet 124 directing air from the outlet 54 of the chamber 70 in the first housing 20 into the plenum chamber 120 in the second housing. The lower wall 122 of the second housing 22 also partially defines the first outlet 56, which directs air into the front seat floor duct 60, and the second outlets 58, which direct air into the rear seat floor ducts 62.

The second housing 22 further includes a defroster outlet 130 and an instrument panel outlet 132. The defroster outlet 130 is formed in the front wall 114 by a frame 134. The defroster outlet 130 directs air from the plenum chamber 120 into a defroster duct (not shown). The instrument panel outlet 132 is formed in the back wall 116 of the second housing 22 and directs air from the plenum chamber 120 into the passenger compartment of the vehicle through ducts (not shown).

Figure 4:
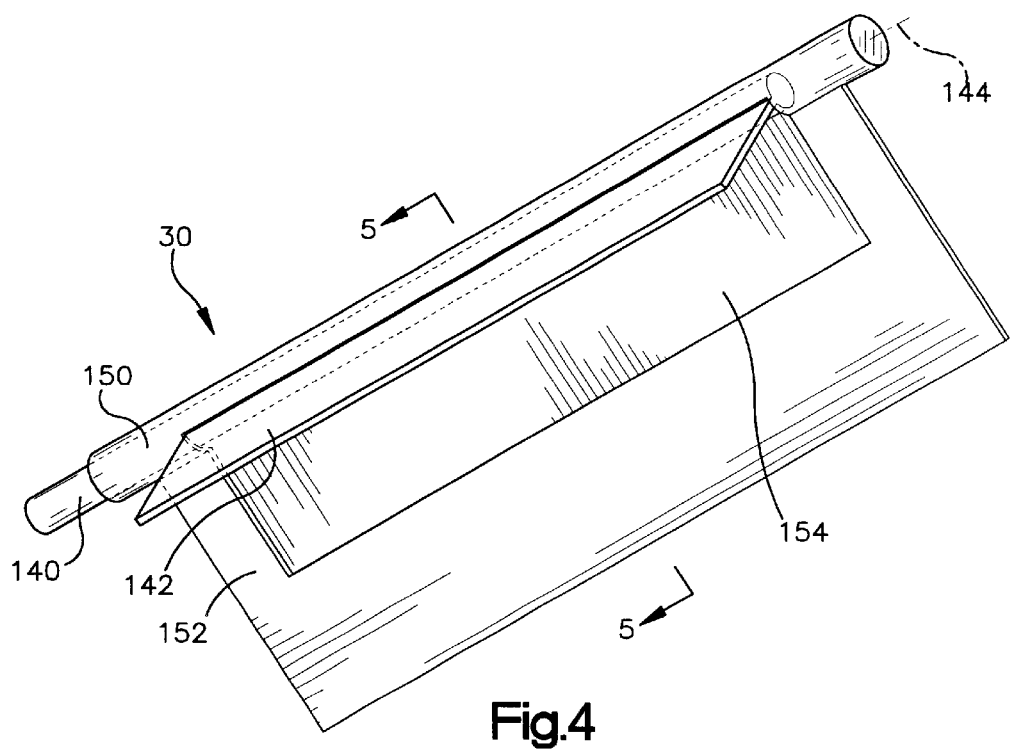
FIG. 4 is a perspective view of a component of the apparatus of FIG. 1.
Figures 5, 5A:
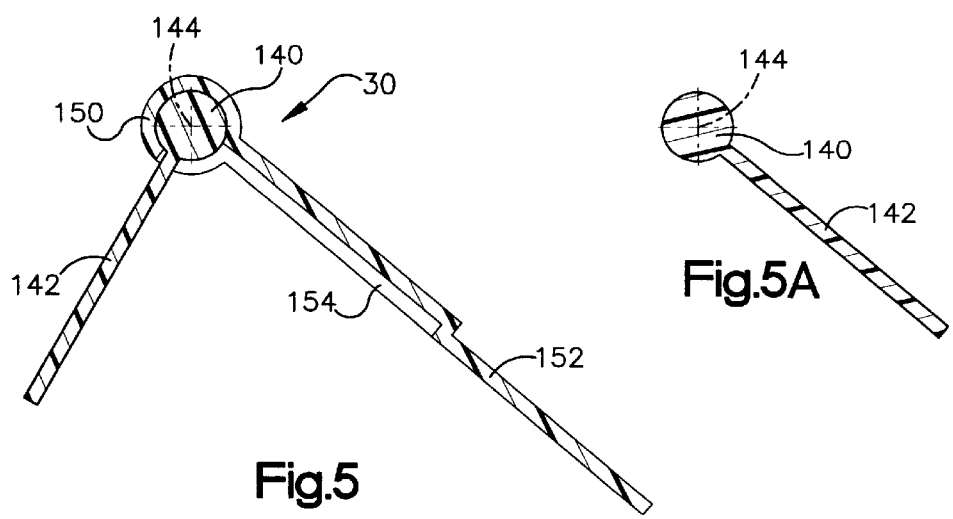
FIG. 5 is a sectional view taken along line 5—5 in FIG. 4.
FIG. 5A is view similar to FIG. 5 illustrating an earlier stage of manufacture.

The first and second rotating door assemblies 30 and 32 are rotatably supported along the upper wall 118 of the second housing 22. The first rotating door assembly 30 includes a rotatable first shaft 140 (FIG. 4) and a first door 142. The first shaft 140 is made of a first polymeric material M1 having a first melting point. The first shaft 140 is supported by the first and second side walls 110 and 112 of the second housing 22 and is rotatable about an axis 144.

The first door 142 projects radially outward from the first shaft 140. The first door 142 is made of the first polymeric material M1 and is molded together with the first shaft as a continuous, unitary part so that the first door rotates along with the first shaft 140 about the axis 144. The first door 142 has a generally rectangular shape with a first surface area A1.

The first rotating door assembly 30 further includes a rotatable sleeve 150 and a second door 152. The sleeve 150 is made of a second polymeric material M2 that has a second melting point that is lower than the first melting point of the first polymeric material M1 to enable the sleeve to be molded over the first shaft 142 (after the first shaft has cooled down) using a known overmolding process. The sleeve 150 is disposed coaxially about the first shaft 142 and is rotatable about the axis 144 relative to the first shaft.

The second door 152 projects radially outward from the sleeve 150. The second door 152 is made of the second polymeric material M2 and is molded together with the sleeve 150 as a continuous, unitary component so that the second door rotates about the axis 144 along with the sleeve relative to the first door 142. Further, the second door 152 is molded over the first door 142 during the same process used to mold the sleeve 150 over the first shaft 140. The second door 152 has a generally rectangular shape and a second surface area A2 that is larger than the surface area A1 of the first door 142. The second door 152 includes a rectangular recess 154 that is dimensioned to receive the first door 142 and allow the first and second doors to share the same axis 144 of rotation.

It is important that the first and second polymeric materials M1 and M2 be selected so that they are incompatible with each other. By being incompatible with each other, it is meant that the coefficient of friction between the first shaft 140 and the sleeve 150 is such that the second polymeric material M2 does not form a chemical or mechanical bond with (i.e., does not stick to), the first polymeric material M1 either during, or after, the sleeve is molded over the first shaft. Thus, the first shaft 140 is able to rotate freely within the sleeve 150.

The first polymeric material M1 may be a thermoplastic material or a thermoset material. For example, the first polymeric material M1 may be a liquid crystal polymer such as Vectra® brand plastic, which is liquid crystal aromatic polyester. Another suitable first polymeric material M1 is Xenoy® brand plastic, which is a blend of polycarbonate and polyester. The second polymeric material M2 may be a thermoplastic material or a thermoset material. For example, the second polymeric material M2 may be Delrin® brand plastic, which is a polyacetal, or Nylon® plastic brand plastic, which is a polyamide. Once the two polymeric materials M1 and M2 have been determined to be incompatible with each other, it generally does not matter which of the two polymeric materials is chosen to form the first shaft 140 and which is chosen to form the sleeve 150, as long as the melting point of the material chosen to form the sleeve is lower than the melting point of the material chosen to form the first shaft.

Table 1, below, is a matrix illustrating the incompatibility of some common polymeric materials. It should be understood that Table 1 is not an exhaustive list of all the incompatible combinations of polymeric materials, but is only offered as an example of some incompatible polymeric material combinations which might be useful in practicing the present invention. A diamond (♦) in a box indicates that the polymeric material in the vertical column containing the box is incompatible with the polymeric material in the horizontal row containing the box. For instance, polyacrylobutadiene styrene (ABS) and polypropylene (PP) are incompatible. It should be noted that the first and/or second polymeric materials could have friction reducing additives, such as Teflon powder, molybdenum disulfide ($M_oS_2$), waxes or any other additive known to those skilled in the art.

TABLE 1

|       | ABS | ASA | CA | EVA | PA 6 | PA 66 | PC | PE-HD | PE-LD | PMMA | POM | PP | PPO mod | PS-GP |
|-------|-----|-----|----|----|------|-------|----|----|-------|------|-----|----|---------|-------|
| ABS   |     |     |    |    |      |       | ♦  | ♦  |       |      | ♦   | ♦  | ♦       | ♦     |
| ASA   |     |     |    |    |      |       | ♦  | ♦  |       |      | ♦   | ♦  | ♦       | ♦     |
| CA    |     |     |    |    |      |       | ♦  | ♦  |       |      | ♦   | ♦  | ♦       | ♦     |
| EVA   |     |     |    |    |      |       |    |    |       |      |     |    |         |       |
| PA 6  |     |     |    |    |      |       |    |    |       |      |     |    |         | ♦     |
| PA 66 |     |     |    |    |      |       |    |    |       |      |     |    |         | ♦     |
| PC    |     |     |    |    |      |       |    | ♦  | ♦     |      | ♦   |    |         | ♦     |
| PE-HD | ♦   | ♦   | ♦  |    |      |       | ♦  |    |       |      | ♦   |    |         | ♦     |
| PE-LD | ♦   | ♦   | ♦  |    |      |       | ♦  |    |       |      |     |    |         | ♦     |
| PMMA  |     |     |    |    |      |       |    |    |       |      |     |    |         | ♦     |
| POM   |     |     |    |    |      |       |    |    |       |      |     |    |         | ♦     |
| PP    | ♦   | ♦   | ♦  |    |      |       | ♦  | ♦  |       |      |     |    |         | ♦     |
| PPO mod. | ♦ | ♦   | ♦  |    |      |       |    |    |       |      |     |    |         |       |

TABLE 1-continued

| | | | | | | | | | | | | | | |
|---|---|---|---|---|---|---|---|---|---|---|---|---|---|---|
| PS-GP | ♦ | ♦ | ♦ | | ♦ | ♦ | ♦ | ♦ | ♦ | ♦ | ♦ | ♦ | | |
| PS-HI | ♦ | ♦ | ♦ | | ♦ | ♦ | ♦ | ♦ | ♦ | ♦ | ♦ | ♦ | | |
| PBTP | | | | | | | ♦ | ♦ | | | ♦ | ♦ | ♦ | |
| TPU | | | | ♦ | | | ♦ | ♦ | | | ♦ | ♦ | ♦ | |
| PVC | | | | ♦ | | | | | | | | ♦ | | |
| SAN | | | | | | | ♦ | ♦ | | | ♦ | ♦ | ♦ | |
| Blend | | | | | | | ♦ | ♦ | | | ♦ | ♦ | ♦ | |
| PC + PBTP | | | | | | | | | | | | | | |
| Blend PC + ABS | | | | | | | ♦ | ♦ | | | ♦ | ♦ | ♦ | |

| | PS-HI | PBTP | TPU | PVC | SAN | Blend PC + PBTB | Blend PC + ABS |
|---|---|---|---|---|---|---|---|
| ABS | ♦ | | | | | | |
| ASA | ♦ | | | | | | |
| CA | ♦ | | | | | | |
| EVA | | | | ♦ | ♦ | | |
| PA 6 | ♦ | | | | | | |
| PA 66 | ♦ | | | | | | |
| PC | ♦ | | | | | | |
| PE-HD | ♦ | ♦ | ♦ | | ♦ | ♦ | ♦ |
| PE-LD | ♦ | ♦ | ♦ | | ♦ | ♦ | ♦ |
| PMMA | ♦ | | | | | | |
| POM | ♦ | | | | | | |
| PP | ♦ | ♦ | ♦ | | ♦ | ♦ | ♦ |
| PPO mod. | ♦ | ♦ | ♦ | ♦ | ♦ | ♦ | ♦ |
| PS-GP | ♦ | ♦ | ♦ | | ♦ | ♦ | ♦ |
| PS-HI | ♦ | ♦ | ♦ | | ♦ | ♦ | ♦ |
| PBTP | ♦ | | | | | | |
| TPU | ♦ | | | | | | |
| PVC | | | | | | | |
| SAN | ♦ | | | | | | |
| Blend | ♦ | | | | | | |
| PC + PBTP | | | | | | | |
| Blend PC + ABS | ♦ | | | | | | |

♦ no adhesion
ABS — polyacrylobutadiene styrene
ASA — acrylonitrile-styrene-acrylate
CA — cellulose acetate
EVA — ethylene-vinylacetate
PA 6 — polyamide 6 (nylon 6)
PA 66 — polyamide 66 (nylon 66)
PC — polycarbonate
PE-HD — polyethylene (High Density)
PE-LD — polyethylene (Low Density)
PMMA — poly(methyl) methacrylate
POM — polyoxymethylene
PP — polypropylene
PPO mod. — poly(phenylene oxide) (Modified)
PS-GP — polystyrene (General Purpose)
PS-HI — polystyrene (High Impact)
PBTP — polybutylene terapthalate
TPU — thermoplastic polyurethane
PVC — polyvinylchloride
SAN — polyacrylostyrene The second door assembly 32 comprises a second shaft 160 and a third door 162. The second shaft 160 is supported by the first and second side walls 110 and 112 of the second housing 22 and is rotatable about a second axis 164. The third door 162 projects radially outward from the second shaft 160. The second shaft 160 and the third door 162 are made of a polymeric material and are molded together as a continuous, unitary part so that the third door rotates along with the second shaft about the second axis 164.

Rotation of the first and second door assemblies 30 and 32 is controlled by an actuator (not shown). U.S. Pat. No. 6,209,404, which is assigned to the assignee of the present invention, describes a suitable actuator for controlling both the first and second door assemblies 30 and 32. It should, however, be understood that another actuator or multiple actuators could be used to control the first and second door assemblies 30 and 32.

Figure 6:
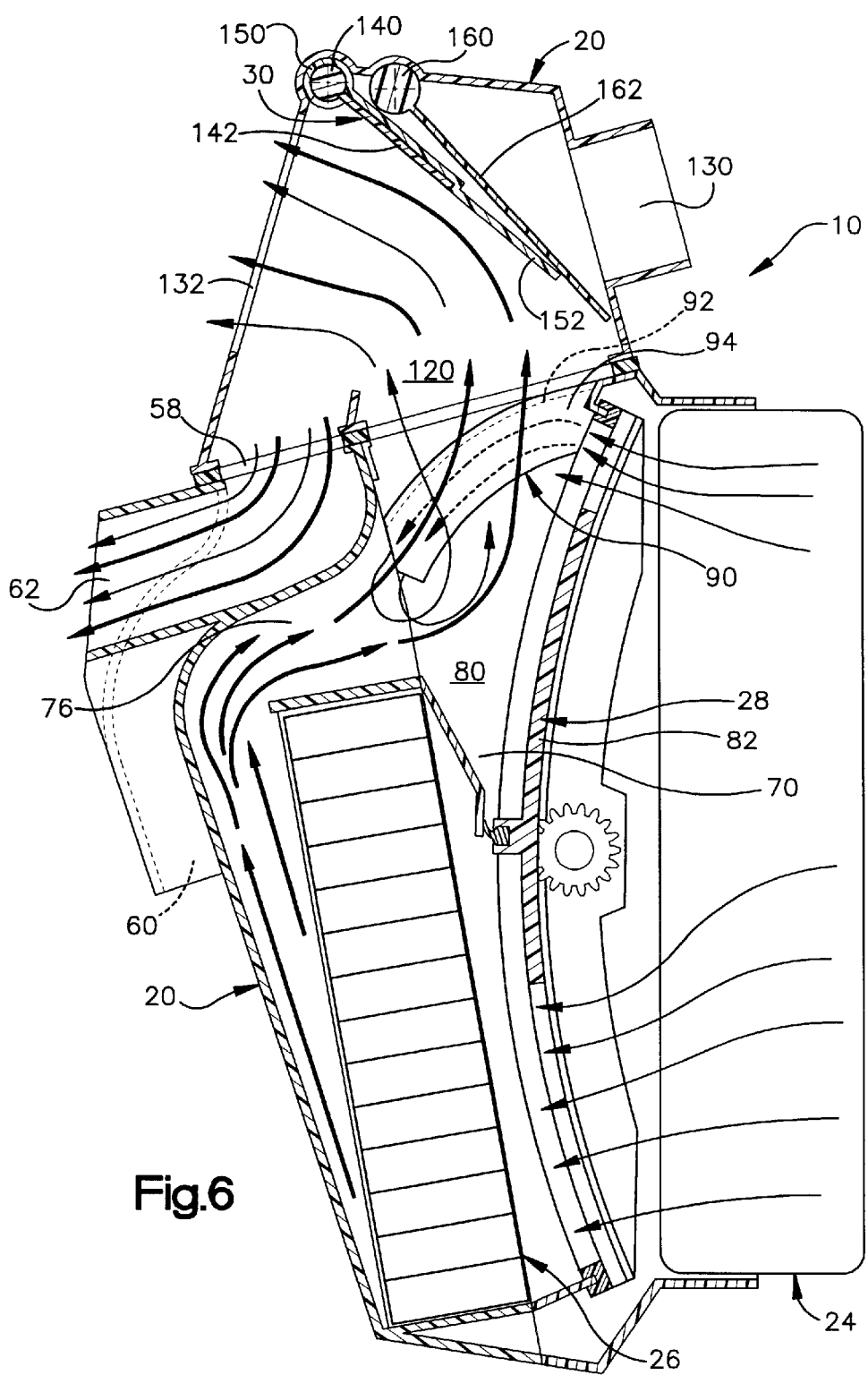
FIG. 6 is a view similar to FIG. 1 illustrating the flow of hot and cold air through the apparatus.

FIG. 6 illustrates how the apparatus 10 according to the present invention functions to causing mixing of cold air with hot air in the mixing portion 80 of the chamber 70. In FIG. 6, the arcuate door 82 in the sliding door assembly 28 is in an intermediate position to provide air at an intermediate temperature to the outlets 56, 58, 130 and 132 into the passenger compartment. With the arcuate door 82 in the intermediate position, all of the air passes through the evaporator core 24 and is cooled. A portion of the cold air (indicated by the thin-line arrows in FIG. 6) from the evaporator core 24 is directed under the arcuate door 82 and into the heater core 26 for heating. The heated air (indicated by the thick-line arrows in FIG. 6) then passes through the heated air inlet duct 76 and into the mixing portion 80 of the chamber 70 in the first housing 20. Another portion of the cold air from the evaporator core 24 passes over the top of the arcuate door 82 and directly into the mixing portion 80 of the chamber 70.

The hot air that enters the mixing portion 80 of the chamber 70 through the heated air inlet duct 76 is moving at a relatively low velocity due to its tortuous path through the heater core 26 and the heated air inlet duct. In contrast, the cold air that enters the mixing portion 80 of the chamber 70 directly from the evaporator core 24 is moving at a relatively high velocity. This disparity in velocity can lead to undesirable temperature stratification in the HVAC system as the faster moving cold air can move past the slower hot air and exit through the instrument panel outlet 132, forcing the hot air to exit through the first and second outlets 56 and 58. However, in accordance with a feature of the present invention, the airflow diverters 90 and 100 in the mixing portion 80 of the chamber 70 function to minimize any such temperature stratification in the HVAC system.

To minimize temperature stratification, the airflow diverters 90 and 100 in the mixing portion 80 of the chamber 70 redirect portions of the cold air that pass over the top of the arcuate door 82 adjacent the side walls 40 and 42 of the first housing 20 where the airflow diverters are located. The cold air that passes over the arcuate door 82 adjacent the first side wall 40 comes into contact with the first and second walls 92 and 94 of the first airflow diverter 90, causing the air to be redirected downward, as shown by the arrows in FIG. 6, into the flow of hot air in the mixing chamber 80 of the chamber 70. Likewise, the cold air that passes over the arcuate door 82 adjacent the second side wall 42 comes into contact with the first and second walls of the second airflow diverter 100, causing the air to be redirected downward, as shown by the arrows in FIG. 6, into the flow of hot air in the mixing chamber 80 of the chamber 70.

The cold air that is redirected downward by the airflow diverters 90 and 100 then mixes with the hot air in the mixing portion 80 of the chamber 70. Further, the redirected cold air, along with the cold air that flows directly into the center of the mixing portion 80 of the chamber 70, pushes the hot air upward into the plenum chamber 120 in the second housing 22. The mixing of hot and cold air that takes place in the mixing portion 80 of the chamber 70 ensures that the air flowing into the plenum chamber 120 and out of the instrument panel outlet 132 and the floor outlets 56 and 58 has a fairly uniform temperature. It should be noted that the airflow diverters 90 and 100 do not extend across the entire width of the first housing 20 in order to maintain a sufficient quantity of overall airflow, as the airflow diverters do decrease the velocity of the cold air that comes into contact with them.

Inside the second housing 22, the first and second door assemblies 30 and 32 are rotatable between a number of different positions to direct the air from the mixing portion 80 of the chamber 70 out into selected areas of the vehicle. In the positions shown in FIG. 6, the air from the mixing portion 80 of the chamber 70 flows into the plenum chamber 120 and is directed out through the instrument panel outlet 132 as well as the floor outlets 56 and 58. FIG. 7 shows the first door 142 of the first door assembly 30 covering a portion of the instrument panel outlet 132 to decrease the amount of air flowing out through the instrument panel outlet and increase the amount of air flowing out through the floor outlets 56 and 58.

Figure 10:
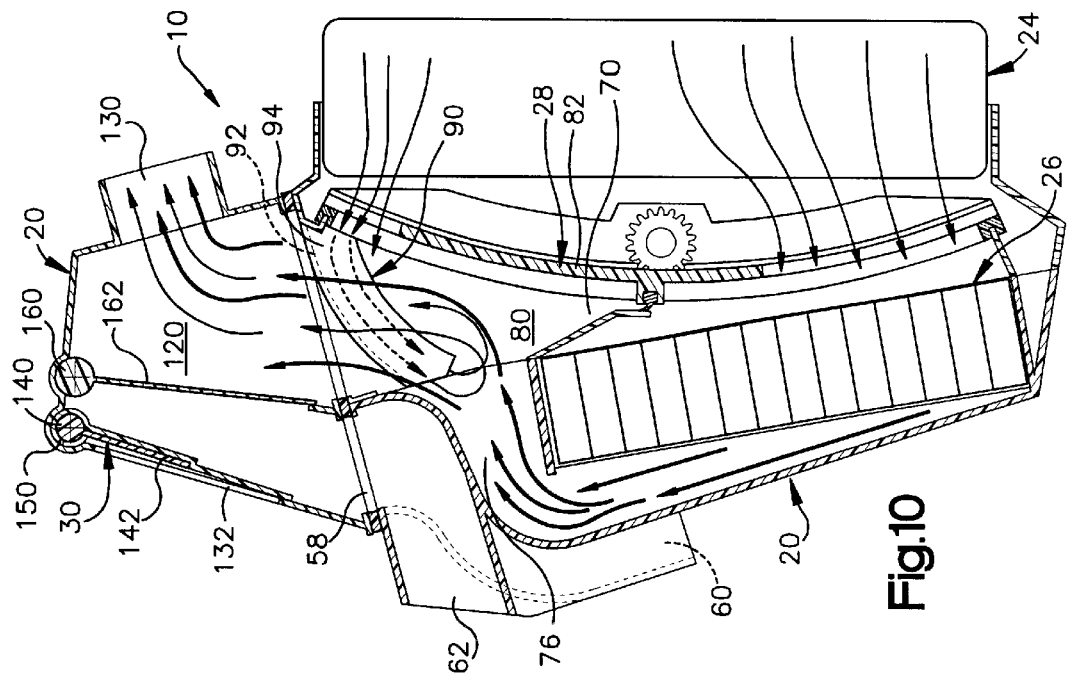
FIG. 10 is a view similar to FIG. 6 illustrating parts of the apparatus in different positions.
Figure 9:
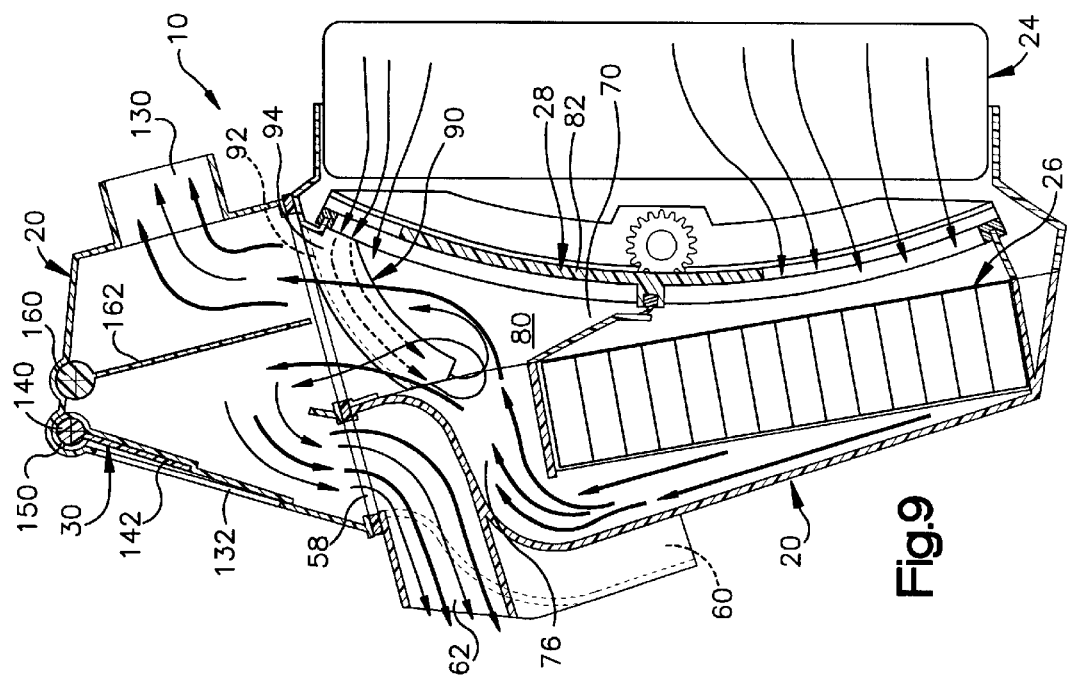
FIG. 9 is a view similar to FIG. 6 illustrating parts of the apparatus in different positions.

FIG. 8 illustrates a different position for the first door assembly 30 in which the second door 152 completely covers the instrument panel outlet 132, thereby directing all of the air to exit through the floor outlets 56 and 58. FIG. 9 is similar to FIG. 8, but shows the second door assembly 32 rotated to a position which allows a portion of the air from the mixing portion 80 of the chamber 70 to flow out of the plenum chamber 120 through the defroster outlet 130. Another variation is illustrated in FIG. 10, where the second door assembly 32 is rotated to a position that directs all of the air from the mixing portion 80 of the chamber 70 to flow out of the plenum chamber 120 through the defroster outlet 130.

From the above description of the invention, those skilled in the art will perceive improvements, changes and modifications. Such improvements, changes and modifications within the skill of the art are intended to be covered by the appended claims.

Having described the invention, I claim:

1. A door assembly for use in a heating, ventilation, and air conditioning system in a vehicle, said door assembly comprising:

a rotatable shaft made of a first polymeric material and having an axis about which said shaft rotates;

a first door projecting radially from said first shaft, said first door being made of said first polymeric material and being molded together with said shaft as a continuous, unitary part so that said first door is rotatable about said axis;

a rotatable sleeve made of a second polymeric material that has a lower melting point than said first polymeric material to enable said sleeve to be molded over said shaft, said sleeve being disposed coaxially about said shaft and being rotatable about said axis relative to said shaft; and a second door projecting radially from said sleeve, said second door being made of said second polymeric material and being molded together with said sleeve as a continuous, unitary component so that said second door is rotatable about said axis relative to said first door.

2. The door assembly of claim 1 wherein said second door has a larger surface area than said first door.

3. The door assembly of claim 2 wherein said second door includes a recess for receiving said first door.

4. The door assembly of claim 1 wherein said second door includes a recess for receiving said first door.

5. An apparatus for a heating, ventilation, and air conditioning system that provides air at a controlled temperature into a passenger compartment in a vehicle, said apparatus comprising:

a housing having a chamber, said housing defining at least one inlet through which air flows into said chamber, said housing further defining at least two outlets for directing air flow out of said chamber; and a door assembly disposed in said chamber, said door assembly comprising:

a rotatable shaft made of a first polymeric material and having an axis about which said shaft rotates;

a first door projecting radially from said first shaft said first door being made of said first polymeric material, said first door and said shaft comprising a continuous, one-piece, unitary part so that said first door is rotatable about said axis with said shaft, said first door being movable to at least partially block air flow out of one of said at least two outlets;

a rotatable sleeve made of a second polymeric material that has a lower melting point than said first polymeric material to enable said sleeve to be molded over said shaft, said sleeve being disposed coaxially about said shaft and being rotatable about said axis relative to said shaft; and a second door projecting radially from said sleeve, said second door being made of said second polymeric material, said second door and said sleeve comprising a continuous, one-piece, unitary component so that said second door is rotatable about said axis relative to said first door, said second door being movable to block air flow out of said one of said at least two outlets.

6. The apparatus of claim 5 wherein said shaft is supported for rotation by said housing.

7. The apparatus of claim 5 wherein said second door has a larger surface area than said first door.

8. The apparatus of claim 7 wherein said second door includes a recess for receiving said first door.

9. The apparatus of claim 5 wherein said second door includes a recess for receiving said first door.

10. A method for providing a door assembly for a heating, ventilation, and air conditioning system, said method comprising the steps of:

molding a first component comprising a first door and a shaft out of a first polymeric material having a first melting point, the first door projecting radially from the shaft and being rotatable along with the shaft about an axis; and overmolding a second component about the first component, the second component being made of a second polymeric material having a second melting point that is lower than the first melting point of the first polymeric material, the second component comprising a second door projecting radially from a sleeve that is coaxially disposed about the shaft and is rotatable relative to the shaft.

* * * * *